United States Patent [19]

Kuban et al.

[11] Patent Number: 4,883,400
[45] Date of Patent: Nov. 28, 1989

[54] DUAL ARM MASTER CONTROLLER FOR A BILATERAL SERVO-MANIPULATOR

[75] Inventors: Daniel P. Kuban, Oak Ridge, Tenn.; Gerald S. Perkins, Altadena, Calif.

[73] Assignee: Martin Marietta Energy Systems, Inc., Oak Ridge, Tenn.

[21] Appl. No.: 236,068

[22] Filed: Aug. 24, 1988

[51] Int. Cl.[4] .............................................. B25J 9/08
[52] U.S. Cl. .......................................... 414/2; 414/5; 414/4; 414/730; 901/8; 901/9
[58] Field of Search ...................... 414/730, 2, 5, 8, 1, 414/3, 4, 6, 7; 901/8, 9

[56] References Cited

U.S. PATENT DOCUMENTS

| | | | |
|---|---|---|---|
| 2,846,084 | 8/1958 | Goertz et al. | 414/5 |
| 3,893,573 | 7/1975 | Fletcher et al. | 414/2 |
| 4,160,508 | 7/1979 | Salisbury, Jr. | 414/4 |
| 4,608,526 | 8/1986 | Martin et al. | 318/628 |
| 4,780,047 | 10/1988 | Holt et al. | 414/8 X |

OTHER PUBLICATIONS

D. P. Kuban et al., "Dual Arm Master Controller Concept," Amer. Nuclear Society Conference on Robotics & Remote Handling in Hostile Environments, Apr. 23-26, 1984.

Primary Examiner—Robert J. Spar
Assistant Examiner—James T. Eller, Jr.
Attorney, Agent, or Firm—James M. Spicer; Bruce M. Winchell

[57] ABSTRACT

A master controller for a mechanically dissimilar bilateral slave servo-manipulator is disclosed. The master controller includes a plurality of drive trains comprising a plurality of sheave arrangements and cables for controlling upper and lower degrees of master movement. The cables and sheaves of the master controller are arranged to effect kinematic duplication of the slave servo-manipulator, despite mechanical differences therebetween. A method for kinematically matching a master controller to a slave servo-manipulator is also disclosed.

7 Claims, 10 Drawing Sheets

DUAL ARM MASTER CONTROLLER FOR A BILATERAL SERVO-MANIPULATOR

The United States Government has rights in this invention pursuant to contract with the Department of Energy.

FIELD OF THE INVENTION

The present invention relates generally to a master controller for a remotely controlled bilateral servo-manipulator, and more particularly to a master controller that is designed to be mechanically dissimilar from, but kinematically identical to, the remotely located slave servo-manipulator that it controls.

BACKGROUND OF THE INVENTION

A remote-controlled, bilateral forcereflecting servomanipulator has been developed for performing maintenance in cells of nuclear fuel reprocessing plants where human access is not permitted. The in-cell slave unit is constructed from gear trains and torque tubes arranged in modular units so as to be totally maintained or replaced within the cell by another in-cell slave unit. Gear and torque tube construction was chosen for the slave unit because of the modularity feature and because it may be made with good radiation resistance. According to conventional practice, the master controller should be designed so as to be mechanically identical to the slave unit. However, the use of gear trains and torque tubes in the slave unit causes it to have increased inertia, friction, and backlash compared to conventional tape and/or cable driven servo-manipulators. Consequently, if the master controller were constructed of gear trains and torque tubes like the slave unit, the master controller would be so hard to move physically that its operation would quickly exhaust the strength of any operator. Accordingly, simply designing the master controller to be a mechanical duplicate of the slave unit is unacceptable. The master controller must be provided with drive mechanics such as cable and sheave drives, for example, so as to minimize the inertia, friction and backlash, and thereby be easier to operate.

It is not conventional practice, however, to design master controllers that are mechanically different from their slave units. Different mechanical arrangements typically result in the slave unit and the master controller having nonidentical kinematics, the effect of which would be to quickly frustrate an operator's performance.

Geometric identity exists between servomanipulators and master controllers if their link lengths and joint orientations are similar. Kinematic identity includes those aspects, but goes further to require identical force and torque transmission in the servo-manipulator and in the master controller. Kinematic identity means that the entire manner in which forces are transmitted through elements of the slave unit, including joint interrelations such as torsional cross-coupling and positional cross-coupling, is identically replicated in the master controller. In the past, kinematic identity was always assured by mechanical duplication.

A torsionally cross-coupled joint is one in which the torque in that joint is a function of both the load at that joint and the load in another interrelated joint. For example, the summation of torques about the elbow joint of a slave servomanipulator with centralized motors or its master controller is equal to the torque supplied by the elbow motor acting through the elbow joint plus a proportional amount of torque supplied by the wrist motors. Therefore, the torque required from the elbow motor to support the elbow depends on how the wrist is being loaded. If these and other kinematic relationships are not the same in both the slave and master units, the kinematic differences can reduce controllability and create inaccurate force reflection between the units.

If torsional loadings at the joints of the master are not cross-coupled with one another as in the slave, then as the operator moves a member such as the wrist of the master, he would feel the elbow load change. It would get lighter if he moved it one direction, and heavier when moved in the opposite direction. This effect would occur even though the load in the slave elbow was not changing.

The drive mechanism of a slave servomanipulator may also interrelate some joints positionally. Such joints are positionally cross coupled if a change in the position of one joint changes the position of the other.

If, with regard to positional changes, the joints of the master were not coupled to one another the same as in the slave, the master wrist, for example, would not move as the elbow is moved, but the slave wrist would. In such case, the wrists of the slave and master would not move synchronously, which would be unacceptable.

As the state of the art advances, it has been considered to use a master controller having nonreplica kinematics but to modify the control loop of the robotic system to overcome the kinematic differences. The calculations needed for this approach would require very fast software with a very powerful computer in order to have the calculation/control loop close fast enough to make the system stable. Such a control system may be possible in the future. The present invention, however, makes it possible to use a conventional position-position control system such as those in widespread use today even though the master and slave units are mechanically dissimilar.

SUMMARY OF THE INVENTION

Accordingly, one of the objects of the present invention is to provide a method for designing a master controller which is kinematically identical to, but mechanically dissimilar from, a given slave servo-manipulator.

Another object of the present invention is to provide a method for designing a slave servomanipulator and master controller combination wherein the slave unit may be made very robust and the master unit very easy to operate.

Another object of the present invention is to provide a means for designing an efficient master controller for use with an inefficient slave servomanipulator, thereby allowing the operator to have an easy-to-operate master controller while allowing the slave servo-manipulator to be designed for the environment and tasks desired of it.

Another object of the present invention is to provide a master controller for a dissimilar slave servo-manipulator wherein the master unit may be designed for a maximization of efficiencies and a minimization of inertia and mass.

Another object of the present invention is to provide a method for designing mechanically dissimilar master and slave servo-manipulator units while avoiding the use of a complex computer system and large software development that would otherwise be required to handle kinematic dissimilarities in the master and slave units.

Still another object of the present invention is to provide a cable driven master controller for use with a gear and torque tube driven slave servomanipulator.

These and other objects are achieved by the present invention which provides a master controller suitable for controlling a slave servo-manipulator having a first slave member, a first slave joint and a first slave drive train cooperating to define a first degree of movement in the slave manipulator. The slave manipulator also includes a second slave member connected with the first slave member, and a second slave joint. A second slave drive train is operative through the first and second slave joints so as to define a second lower degree of slave movement. The first and second slave drive trains include gear located at the first and second slave joints, which gears define at the first slave joint a first torsional cross-coupling ratio. The gears at the first and second slave joints also define between the first and second slave joints a first positional cross-coupling ratio.

The master controller for controlling such a slave servo-manipulator comprises a first master member, a first master joint and a first master drive train cooperating to define a first degree of master movement. The master controller also includes a second master member connected with the first master member, and a second master joint. A second master drive train is operative through the first and second master joints so as to define a second, lower degree of master movement. The first and second master members and the first and second master joints are mutually arranged so as to replicate identically the kinematic arrangement of the first and second slave members and the first and second slave joints. The first and second master drive trains include sheaves located at the first and second master joints. The sheaves define at the first master joint a second torsional cross-coupling ratio equal to the first torsional cross-coupling ratio of the slave manipulator. The sheaves define between the first and second master joints a second positional crosscoupling ratio equal to the first positional crosscoupling ratio of the slave manipulator.

By such arrangement, kinematic identity is achieved between the master controller and the slave servo-manipulator, despite mechanical differences in the respective drive trains.

The invention also encompasses a method for controlling a slave servo-manipulator comprising the steps of manually operating an arrangement of members and joints that kinematically replicate a slave manipulator and produce cross-coupling loads in the arrangement identical to cross-coupling loads produced in the slave manipulator. The method includes the steps of transmitting torsional loads along the joints of the arrangement with a mechanical drive train different from that of the slave manipulator, matching the cross-coupling load at each joint in the master arrangement to the crosscoupling load of the corresponding joint of the slave manipulator, and matching the positional crosscoupling ratio between joints in the arrangement to the positional cross-coupling ratio between corresponding joints of the slave manipulator.

Both the new apparatus and method of the present invention further encompasses the use of cables in connection with pulleys for driving the elements of the master controller.

BRIEF DESCRIPTION OF THE DRAWINGS

A preferred embodiment of the present invention is described in detail below with reference to the drawings, wherein.

DETAILED DESCRIPTION OF THE PREFERRED EMBODIMENTS

Figure 1:
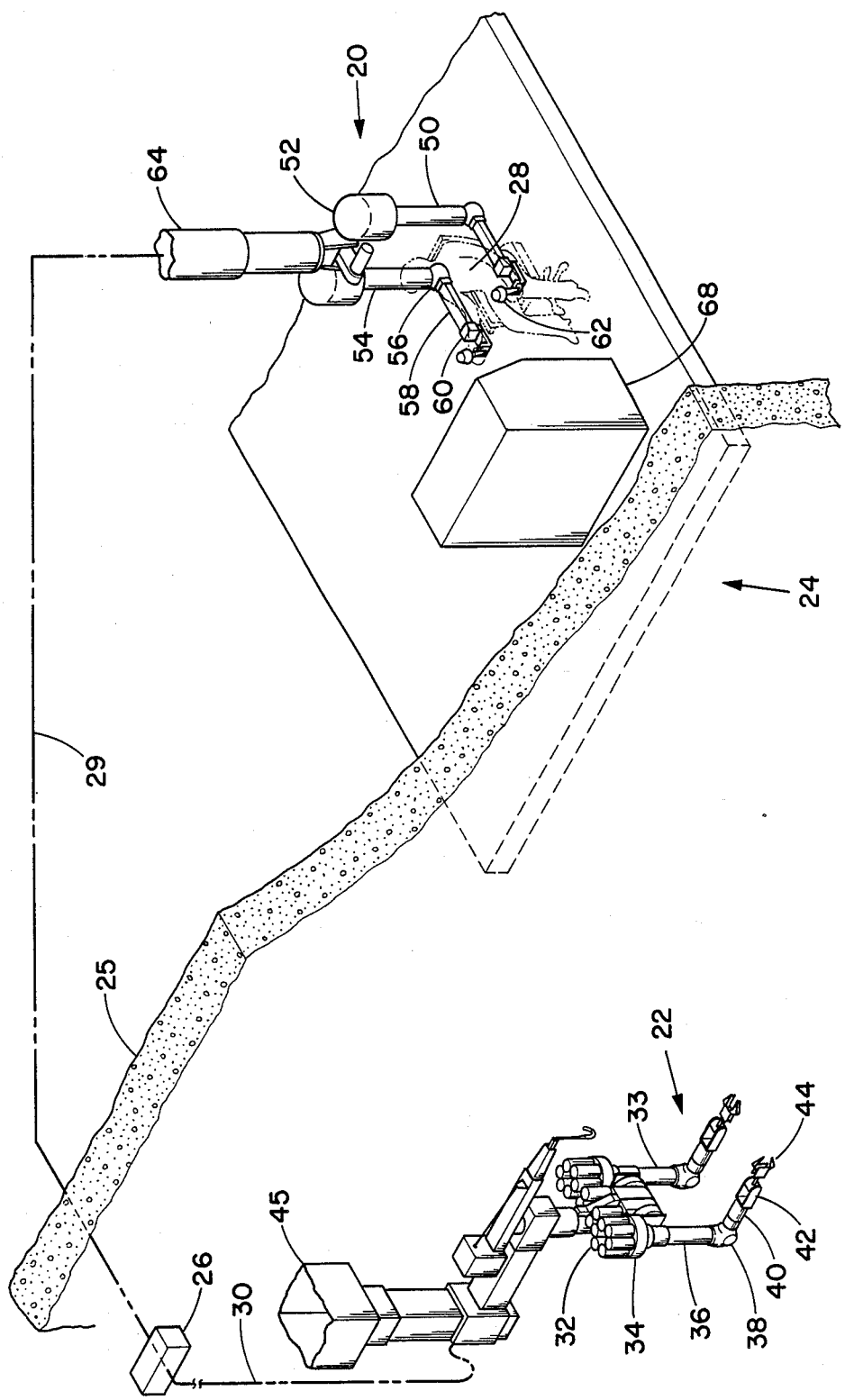
FIG. 1 is a perspective view of an advanced servo-manipulator system including a master controller unit constructed according to a preferred embodiment of the present invention.
Figure 3:
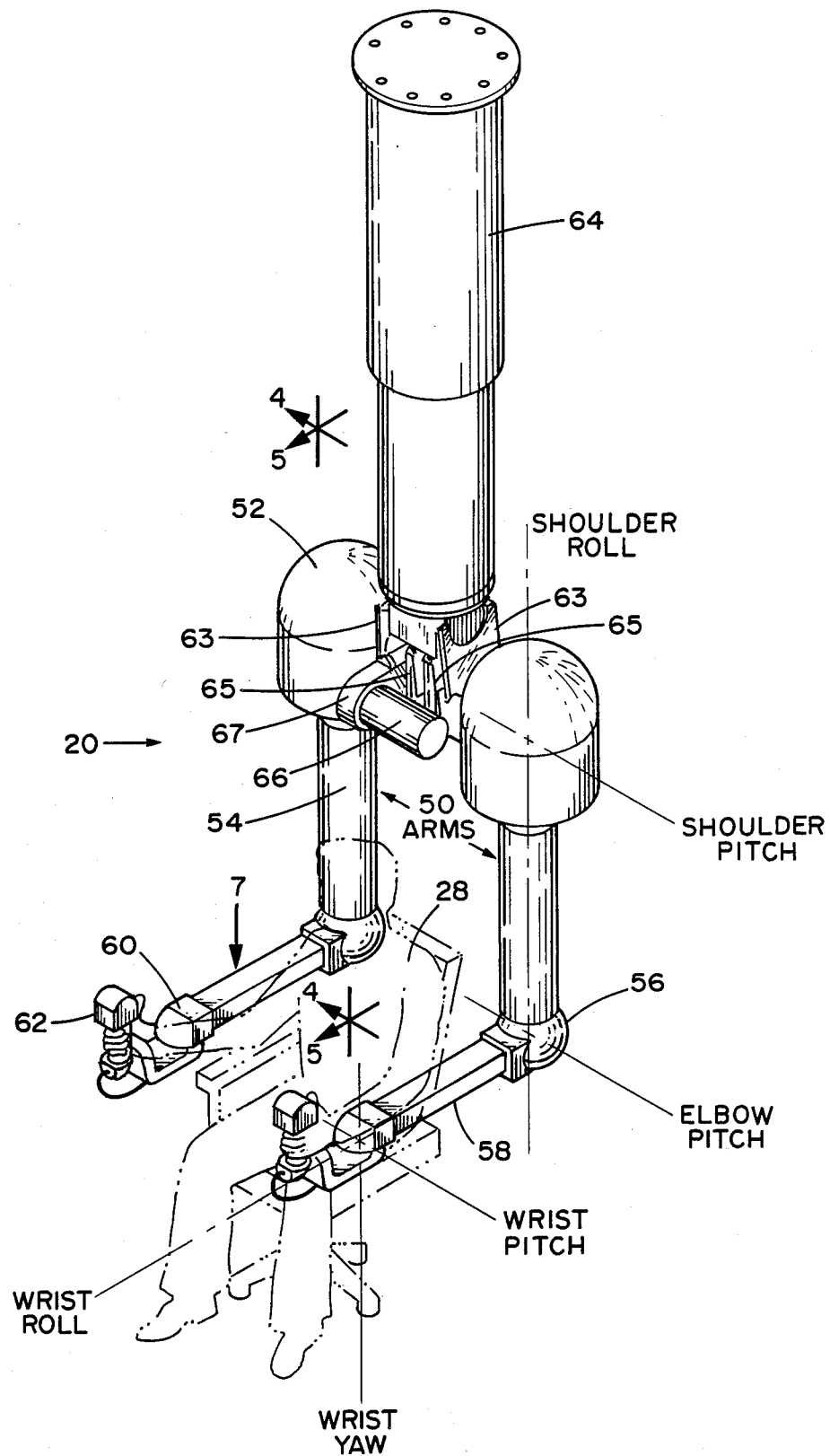
FIG. 3 is an enlarged view of the master controller unit of FIG. 1.

Referring to FIGS. 1 and 3, a preferred embodiment of the present invention is a master controller 20 for controlling a slave servomanipulator unit 22 of an advanced bilateral servomanipulator system 24. The overall system 24 includes a protective cell wall 25 for protecting the operator 28 at the master controller 20 from the dangers of the environment enclosed by the cell wall 25. The servo-manipulator system 24 also includes a calculating unit 26 and electrical connections 29 and 30 between the calculating unit 26 and the master controller 20 and slave unit 22, respectively. The calculating unit 26 provides position-to-position, bilateral comparison between elements of the slave unit 22 and those of the master controller 20 so that differences in loading, movement and/or position between the slave unit 22 and the master controller 20 are corrected.

The slave servo-manipulator unit 22 is of the type developed pursuant to Contract No. W-7405-ENG-26 between the U.S. Department of Energy and Union Carbide Corporation. The slave unit 22 is adapted to perform maintenance tasks in a remotely operated and maintained fuel reprocessing facility. The slave unit 22 is modularized so that modules can be replaced with other modules in situ, with the replacements being performed by another slave unit.

The slave unit 22 includes a pair of arms 33, and sets of motors 32 located atop each shoulder portion 34 of the slave unit 22. Each arm includes an upper arm 36, a forearm 40, an elbow joint 38 between the upper arm 36 and the forearm 40, a wrist joint 42 at the end of each forearm 40 and closeable tongs 44 located at the end of each wrist joint 42. These elements of the slave unit 22 are arranged to provide an anthropomorphic stance which provides seven different degrees of movement including shoulder pitch, shoulder roll, elbow pitch, wrist pitch, wrist yaw, wrist roll, and tong spacing. A moveable transporter 45 supports the slave unit 22 and includes an arrangement for adjusting the vertical position of the slave unit 22.

Details concerning the slave servo-manipulator unit 22 are set forth in co-pending U.S. patent application Ser. No. 720,449, filed Apr. 5, 1985, by W. E. Holt, D. P. Kuban and H. L. Martin.

The master controller 20 is arranged to provide the same anthropomorphic, dual-armed stance as the slave servo-manipulator. Each arm 50 of the controller includes a shoulder pod 52, an upper arm 54 extending downwardly from the shoulder pod 52, an elbow joint 56 between the forearm 58 and the upper arm 54, a wrist joint 60 at the distal end of the forearm 58 and a master handle 62 located on the wrist joint 60.

The master controller 20 is arranged to have the same seven degrees of movement as the slave unit 22, and it features the same anthropomorphic (elbows down) stance as the slave unit. All of the force transmission, the lengths of the links, and the location and orientation of the joints of the master controller 20 are preferably geometrically identical to those of the slave unit 22 except at the wrist joint 60. There the distance from the wrist pitch axis to the tong actuator of the master handle 62 is only about 200 mm (about 50 mm less than in the slave unit 22) to allow the slave tongs 44 to touch without the master handles 62 interfering with each other.

The master controller 20 includes a vertically adjustable column 64 from which the shoulder pods 52 are supported by upper and lower brackets 63 and 65, shown in FIG. 3. A motor 66 and gear box 67 are provided for effecting shoulder pitch motion in each arm 50. The adjustable column 64 of the master controller 20 is located adjacent a console 68 (FIG. 1) for providing the operator 28 with various services including televised viewing of the operations behind the cell wall 25.

Figure 2:
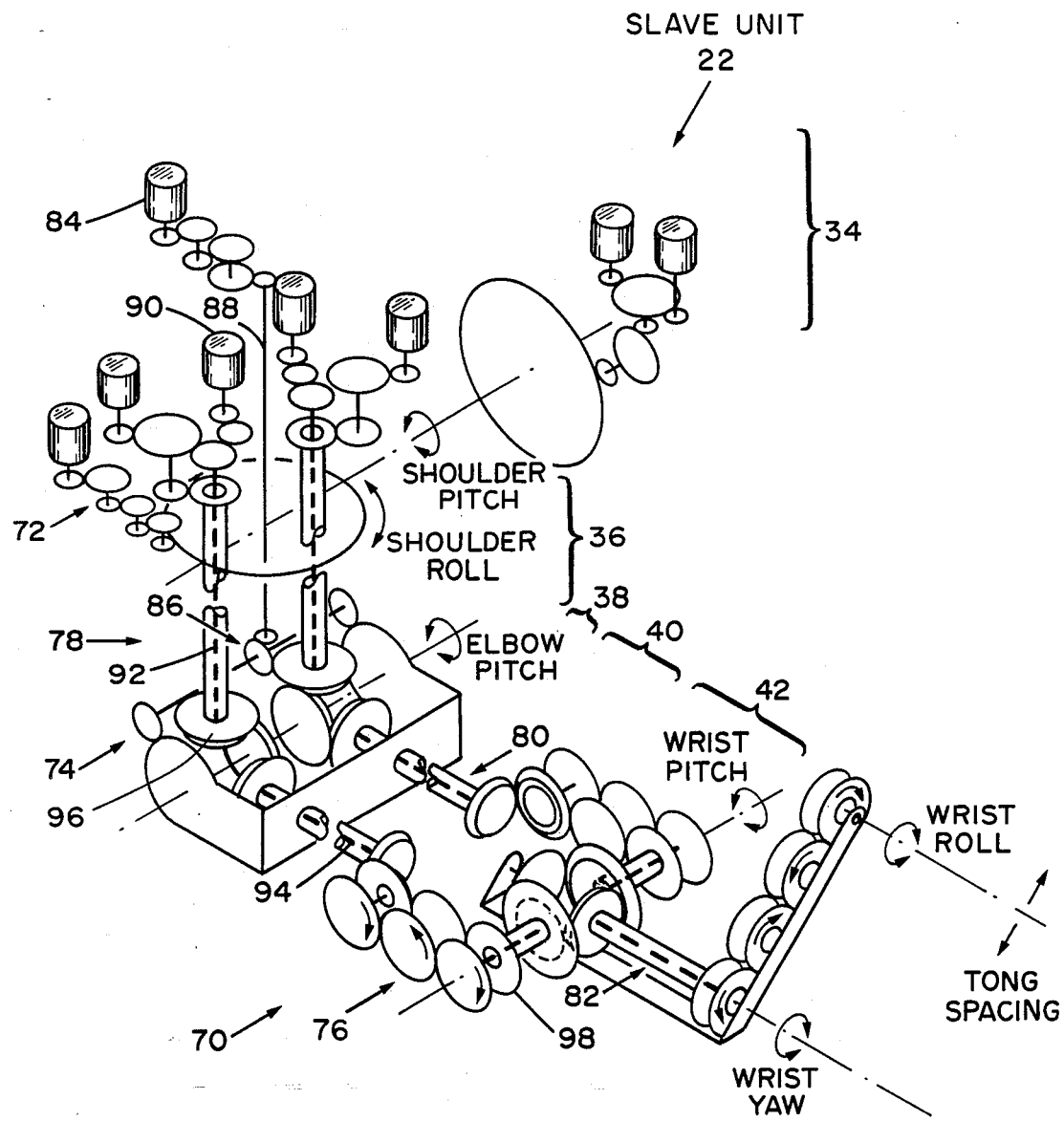
FIG. 2 is a schematic diagram of the drive arrangement of the slave unit of Fig. 1.

Referring to FIG. 2, each arm 33 of the slave servo-manipulator unit 22 houses a drive arrangement 70 comprising gearing arrangements 72, 74 and 76 located at the shoulder portion 34, the elbow joint 38 and the wrist joint 42, respectively, and torque tube arrangements 78, 80 and 82 located along the upper arm 36, the forearm 40 and the wrist joint 42, respectively, of the slave unit 22.

The slave drive arrangement 70 includes an elbow-pitch motor 84 for driving an elbow gearing arrangement 86 through a drive shaft 88. A wristroll motor 90 creates the wrist-rolling motion in the wrist joint 42 by transmitting torque through torque tubes 92 and 94, a first gear assembly 96 located at the elbow joint 38 and a second gear assembly 98 located at the wrist joint 42.

Figure 4:
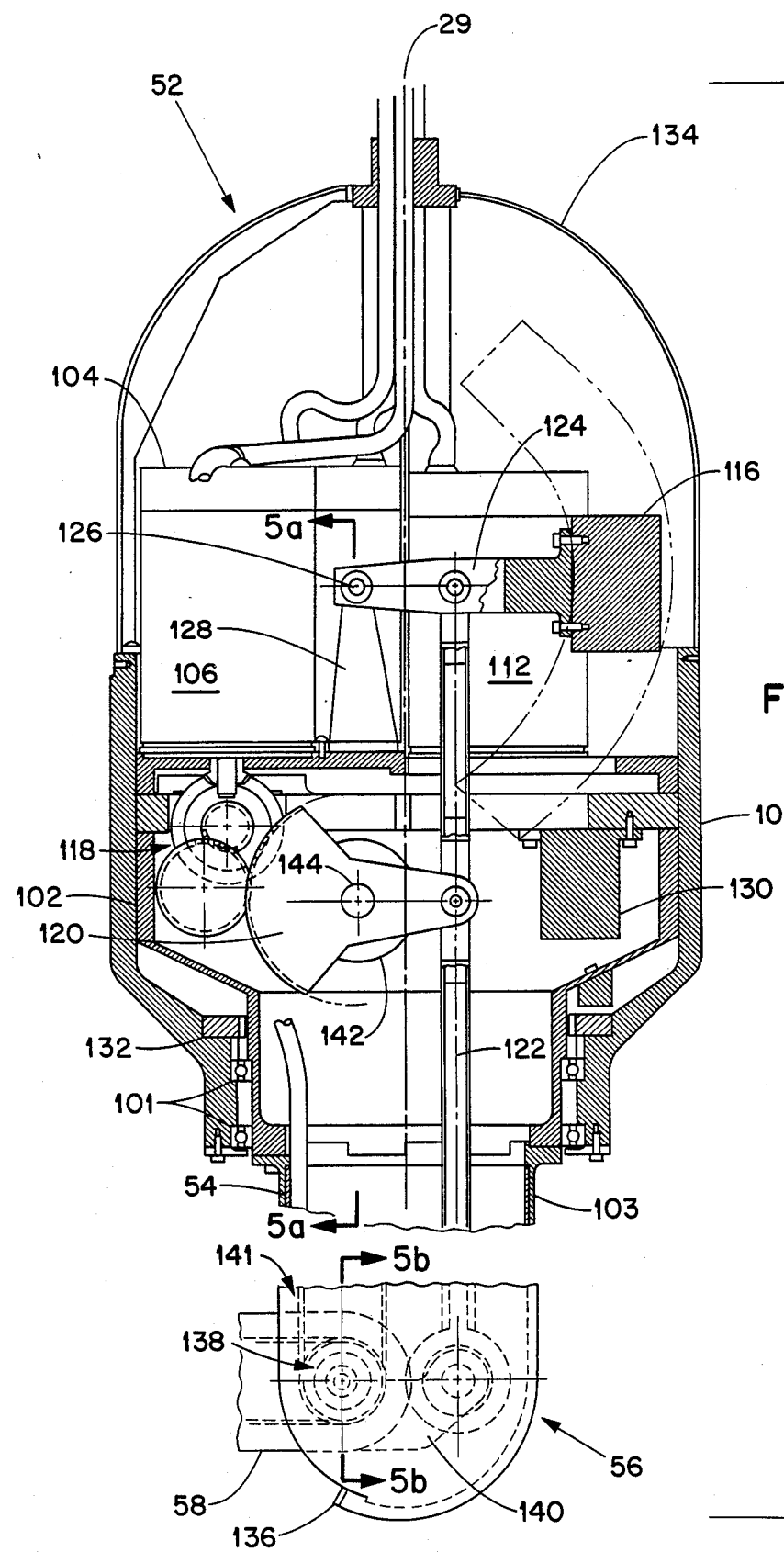
FIG. 4 is a cross-sectional side view of the elbow joint, upper arm and shoulder of the master unit along 4—4 in FIG. 3.
Figure 5A:
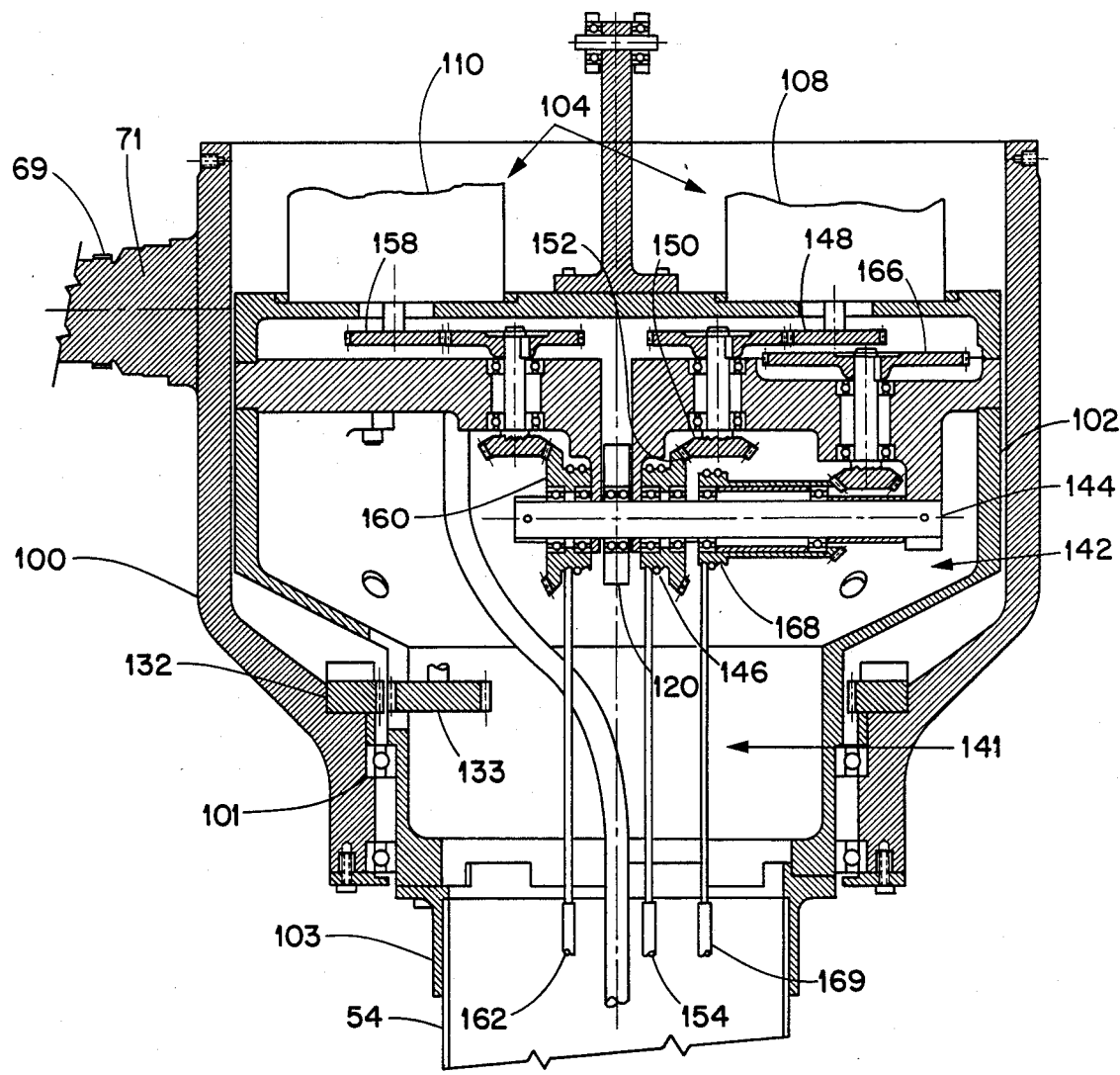
FIG. 5a is a cross-sectional view of the shoulder of the master unit along 5—5 in FIG. 3.

Referring to FIGS. 4 and 5a, details of the master controller 20 will now be described. Each shoulder pod 52 of the master controller 20 includes an outer shoulder housing 100, a gear box 102 and a bearing arrangement 101 between the casing and the gear box so that the gear box 102 is pivotally mounted within the shoulder housing 100. An outer housing 103 of the upper arm 54 is secured to the base portion of the gear box 102 so as to rotate with the gear box 102.

Figure 6:
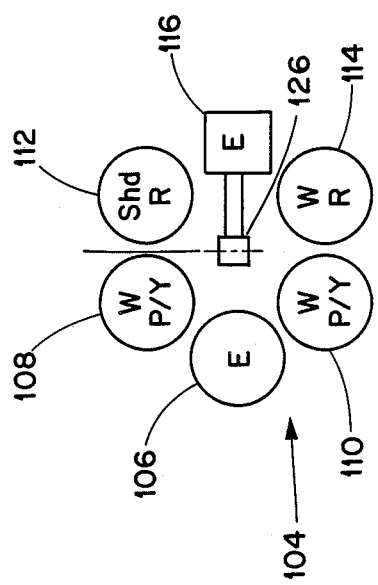
FIG. 6 is a diagram of the motor layout of the shoulder pod of FIG. 4.

Referring also to FIG. 6, an upper portion of the gear box 102 supports a cluster of drive motors 104, which includes an elbow pitch motor 106 located adjacent a forward portion of the shoulder housing 100, first and second wrist pitch/yaw motors 108 and 110 located at opposite sides of the elbow pitch motor 106, a shoulder roll motor 112 and a wrist roll motor 114. An elbow counter weight 116 is supported from the gear box 102 and positioned adjacent a rearward portion of the shoulder housing 100.

Referring particularly to FIG. 4, each of the motors 104 receives control signals from one of the cables of the electrical connection 29 which extends through an upper portion of the shoulder housing 100. The elbow motor 106 is operatively connected to a set of elbow drive gears 118 which are pivotally supported from the gear box 102. The elbow drive gears 118 include a geared lever 120 which, upon pivoting, raises or lowers a connecting shaft 122. A lower end of the connecting bar 122 is pivotally connected to a rearward portion of the forearm 58, and an upper end portion of the connecting bar 122 is pivotally connected to an intermediate portion of a transverse member 124. One end of the member 124 is pivotal about a fulcrum 126 established by a support member 128 rigidly secured to the gear box 102. The other end of the transverse member 124 is rigidly secured to the elbow counter weight 116. As the geared lever 120 is pivoted to adjust the pitch of the forearm 58, the degree of counterbalance effected by the elbow counter weight 116 is adjusted proportionally. Additionally, the arrangement causes the amount of counterbalancing provided by the elbow counter weight 116 to be adjusted according to changes in shoulder pitch even though the pitch of the forearm 58 may be kept constant.

A shoulder pitch counter weight 130 is rigidly affixed to the gear box 102, which together with the elbow counter weight 116 serves to balance the master controller 20 and reduce the loadings imposed upon the operator.

The shoulder housing 100 includes a dome portion 134 which covers the motors so as to minimize the collection of dust and to enhance the overall appearance of the shoulder pods 52.

The lower end portion of the upper arm 54 includes a stop 136 for limiting the pivotal movement of the forearm 58 relative to the upper arm 54. Mounted within the forearm 58 is a plurality of elbow sheaves 138. A flange 140 is pivotally connected to the lower end of the connecting bar 122.

Referring also to FIG. 5a, the sheaves 138 at the elbow joint 56 are connected by a collection of cables 141 to individual members of a collection of rotatable drive sheaves 142 mounted in the gear box 102. Drive sheaves 142 and the geared lever 120 are mounted along a common axle 144 located in the gear box 102 such that the sheaves 142 and the geared lever 120 may rotate independently about the axle 144.

The first wrist pitch/yaw motor 108 is drivingly connected with the first pitch/yaw drive sheave 146 through a gear train 148 which includes a beveled gear 150 that meshes with a beveled gear portion 152 of the first pitch/yaw drive sheave 146.

An endless cable 154 is received by both the first pitch/yaw drive sheave 146 and by a first pitch/yaw elbow sheave 156 at the elbow joint 56 (FIG. 5b) so as to drivingly connect the two. The endless cable 154 is wrapped about grooves located about the first pitch/yaw drive sheave 146 sufficiently to create an appropriate degree of frictional engagement between the cable 154 and the sheave 146. The cable is engaged with the sheave 156 in a similar manner.

A similar arrangement is provided for the second pitch/yaw drive motor 110, including a second gear train 158, a second pitch/yaw drive sheave 160, a second endless cable 162 and a second pitch/yaw elbow sheave 164. It is to be understood that the sheaves 156 and 164 transmit forces for imparting pitch or yaw or a combination of both at the wrist joint 60.

Likewise, a gear train 166 is provided between the wrist roll motor 114 and a wrist roll drive sheave 168. An endless cable 169 operatively connects the wrist roll drive sheave 168 with a wrist roll elbow sheave 170 located at the elbow joint 56.

A shoulder roll drive gear 132 is affixed to the housing 100, which receives a gear wheel 133 driven from the shoulder roll motor 112.

Referring to FIGS. 3 and 5a, the shoulder housing 100 is provided with an axle 71. Shoulder pitch motion is effected by the action of the motor 66 through gears of a second gear box 67 upon the teeth 69 on the shoulder axle 71.

Precision gears and precision bearings are used throughout the gear box 102 to minimize weight and inertia, so that the gear trains provide very low backlash and low inertia.

Figure 5B:
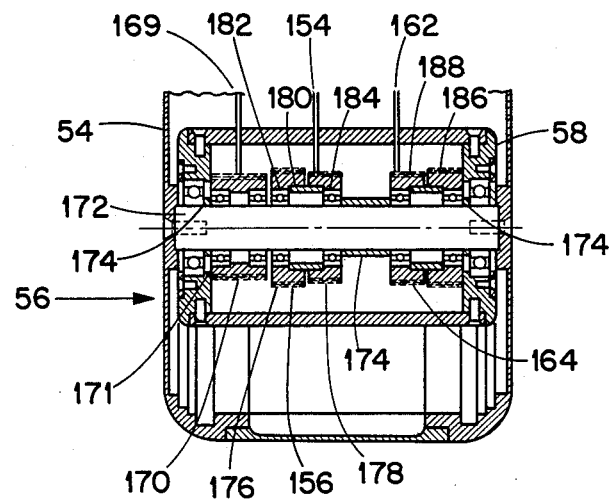
FIG. 5b is a cross-sectional view of the elbow joint along line 5b—5b in FIG. 4.

Referring now to FIG. 5b, the lower end portion of the upper arm 54 is provided with a fixed axle 172. A rearward end portion of the forearm 58 is pivotally received upon the fixed axle 172, together with the first and second pitch/yaw elbow sheaves 156 and 164 and the wrist roll sheave 170. Each of these elements can rotate independently of one another about the axle 172. Spacers 174 are provided to fix spacing between the respective elements.

Figure 7:
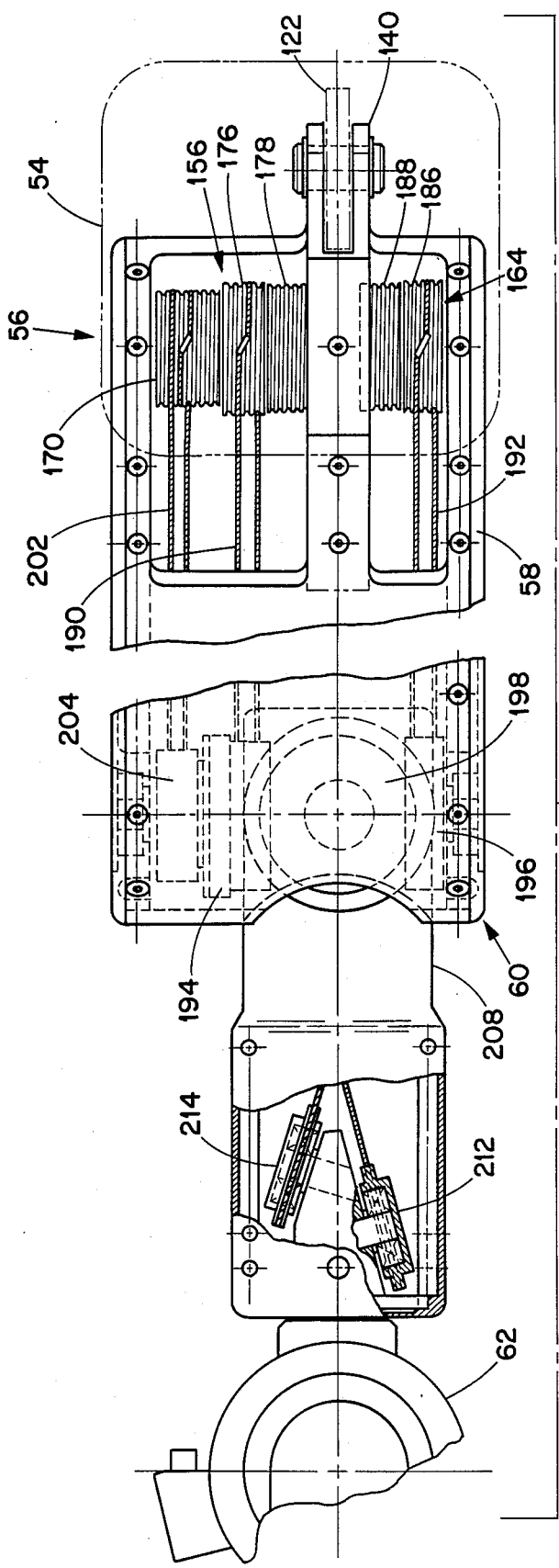
FIG. 7 is a partially sectional plan view of the forearm, wrist joint and elbow joint viewed in the direction of arrow 7 in FIG. 3.

Referring to FIGS. 5b and FIG. 7, the first pitch/yaw elbow sheave 156 includes first and second cable receiving portions 176 and 178 having different diameters and which are internally connected to one another by a ring 180 so that the cable receiving portions 176 and 178 rotate together. Bearings 182 and 184 are interposed between the axle 172 and each of the cable receiving portions 176 and 178. The ring 180 is preferably located between the bearings 182 and 184 and provided with an axial length sufficient to fix the position of the cable receiving portions 176 and 178 relative to the bearings. Each of the cable receiving portions 176 and 178 may be force fitted, cemented, welded or attached in any other suitable fashion to the ring 180. These cable receiving portions can also be formed integrally. The second pitch/yaw elbow sheave 164 is likewise provided with cable receiving portions 186 and 188.

The cable receiving portions 178 and 188 of the first and second elbow sheaves 156 and 164 receive the endless cables 154 and 162 of the upper arm 54, respectively, while the cable receiving portions 176 and 186 receive endless cables 190 and 192 of the forearm 58, respectively. The cables 190 and 192 are also engaged with wrist pitch/yaw control sheaves 194 and 196 located at the distal end of the forearm 58, respectively. The sheaves 194 and 196 operate opposite sides of a differential 198. The cable receiving portions 176 and 178 of the elbow sheave 156 have different diameters so as to effect a relative drive ratio between themselves as rotational movement and torques are transferred through the elbow sheave 156 by the cables 154 and 190. A similar effect is produced by the difference in diameters between the cable receiving portions 186 and 188 of the elbow sheave 164.

In the preferred embodiment, the wrist roll elbow sheave 170 is constructed with constant external diameter, although in other designs, it might be provided with more than one external diameter. However, in the preferred embodiment the cable receiving perimeter of the sheave 170 is constructed from a single member supported on bearings 171 about the axle 172 at the elbow joint 56. One circumferential portion of the wrist roll elbow sheave 170 receives the endless cable 169 of the upper arm 54, while another receives an endless cable 202 of the forearm 58. The other end of the cable 202 is operatively connected about a wrist roll control sheave 204. In the preferred embodiment, the cable 202 is crossed between the sheaves 170 and 204.

Figure 8:
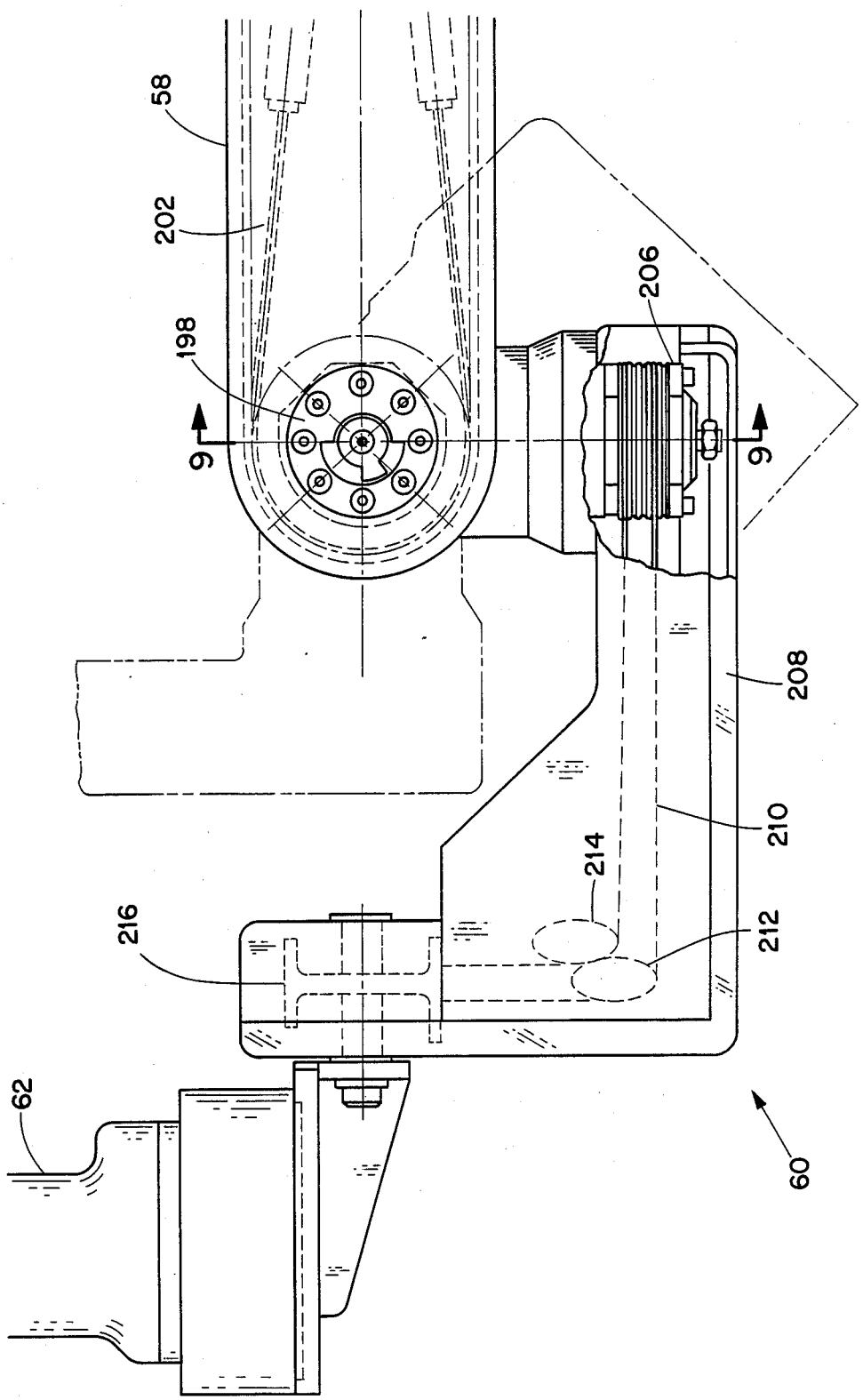
FIG. 8 is a partially sectional side view of the wrist joint of FIG. 3.

Referring to FIGS. 7 and 8, the wrist roll control sheave 204 operates through the differential 198 to drive a second wrist roll control sheave 206. The sheave 206 is located below the differential 198 and is rotatably mounted within a wrist housing 208 so as to be rotatable about an axis at a right angle to that of the wrist roll control sheave 204. An endless cable 210 extends from the second wrist roll control sheave 206 past a pair of intermediate sheaves 212 and 214 to a final wrist roll sheave 216 located in an upper portion of the housing 208. The sheaves 212 and 214 are mounted within the wrist housing 208 so as to cross the endless cable 210 in the region between the sheave 206 and sheaves 214 and 212. The sheaves 212 and 214 also direct the cable 210 at right angles toward the final wrist roll sheave 216. The final wrist roll sheave 216 is rotatably mounted within the wrist housing 208 but is fixed to the master handle 62 so that the wrist roll sheave 216 and the master handle 62 rotate together about the desired wrist roll axis.

Figure 9:
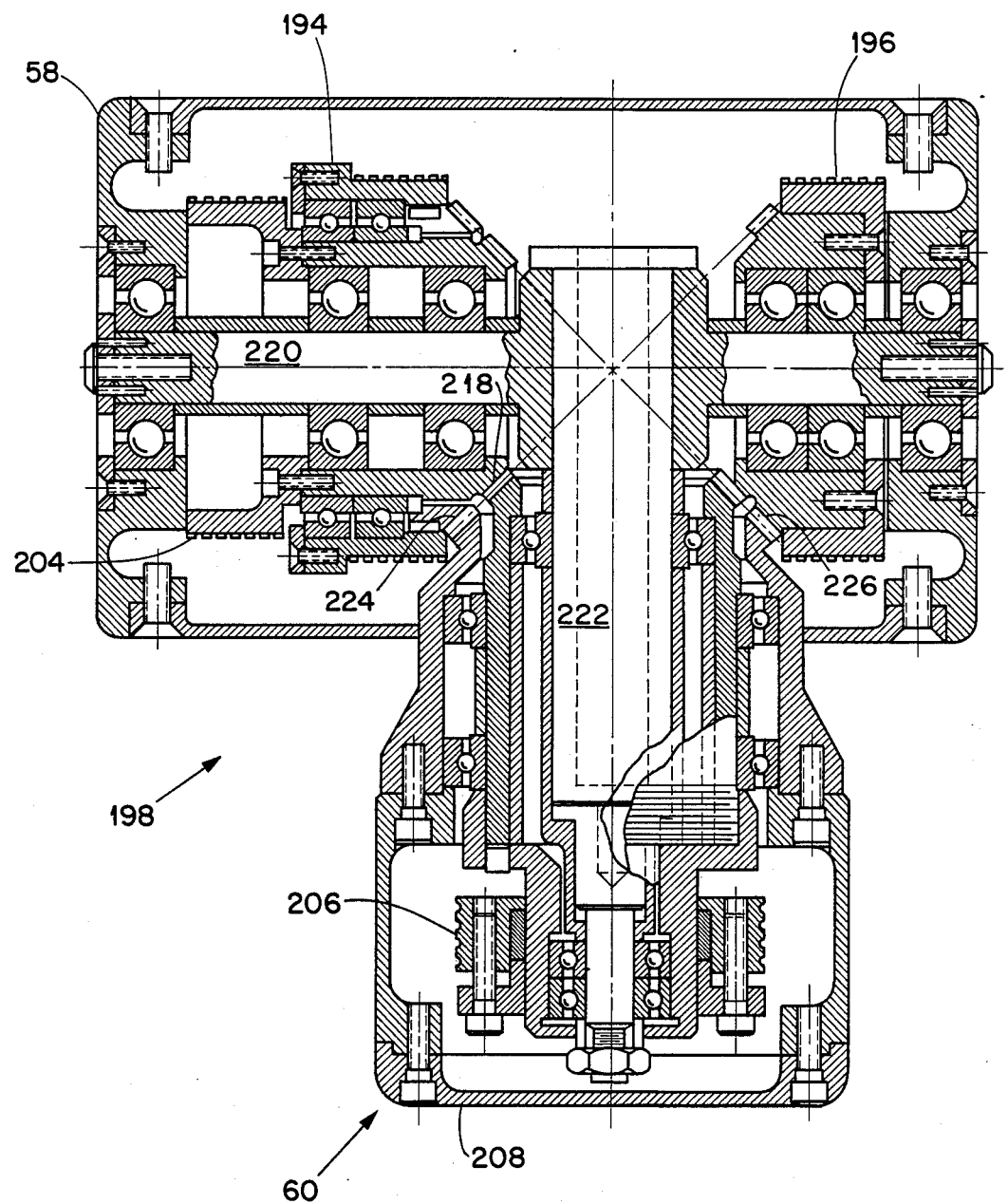
FIG. 9 is a sectional view of the differential at the wrist joint along line 9—9 in FIG. 8.

Referring to FIG. 9, the differential 198 includes a beveled gear drive arrangement 218 between the wrist roll control sheave 204 and the second wrist roll control sheave 206 so that sheave 206 may be rotated irrespective of the pitch and yaw orientation of the wrist housing 208. The first wrist roll control sheave 204 is itself rotatably supported about a shaft 220, which shaft is rotatably connected to the forward end portion of the forearm 58 so as to define the desired wrist pitch axis of the wrist housing 208. A second shaft 222 is fixed to and extends at right angles from the first shaft 220. One bevel gear of the beveled gear drive arrangement 218 and the second wrist roll control sheave 206 are suspended from the second shaft 222. The first and second wrist pitch/yaw control sheaves 194 and 196 are rotatably mounted about the first shaft 220.

The differential 198 also includes a beveled gear arrangement 224 between the first wrist pitch/yaw control sheave 194 and the wrist housing 208, and another beveled gear arrangement 226 between the second wrist pitch/yaw control sheave 196 and the wrist housing 208. The gear arrangements 224 and 226, together with the bearing arrangements provided between the second shaft 222 and the housing 208, suspend the wrist housing 208 about the second shaft 222 such that the pitch and yaw of the wrist housing 208 relative to the forearm 58 may be controlled. In particular, if one of the sheaves 194 and 196 is caused to move while the other is held in place, the housing 208 will pitch relative to the forearm 58. If both of the sheaves 194 and 196 are caused to rotate oppositely, the wrist housing 208 will undergo a change in yaw relative to the forearm 58.

Figure 10:
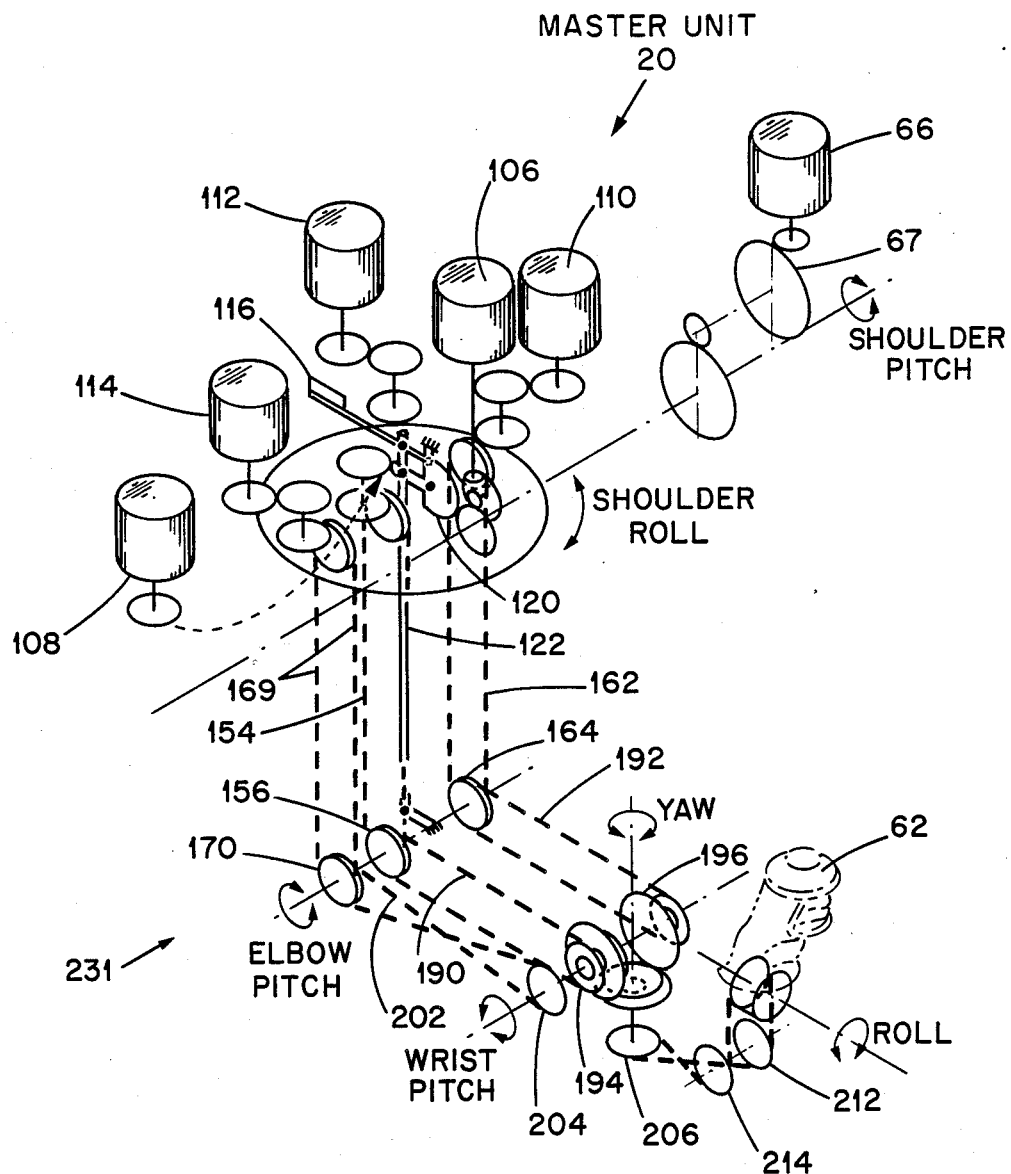
FIG. 10 is a schematic diagram of the drive arrangement of one arm of the master controller unit of FIG. 3.

The above-described preferred embodiment includes a drive arrangement 231 which is depicted in diagrammatic form in FIG. 10 for comparative purposes with the drive arrangement 70 of the slave unit 22 shown in FIG. 2. As previously mentioned, the master controller 20 offers the same seven degrees of movement and features the same anthropomorphic, elbows down stance as the slave unit 22. The lengths of the links and the location and orientation of the joints of the master control are geometrically identical to the slave unit 22, except for the previously noted difference in dimension at the wrist joint 60 of the master controller 20. However, a comparison between the two drive arrangements reveals that although there may be geometric similarities, the two systems are mechanically quite different. The drive arrangement 231 of the master controller 20 is comprised of sheaves and cables, whereas the drive arrangement 70 of the slave unit 22 is comprised of torque tubes and gears. Furthermore, the master controller 20 operates with a reduced load in comparison to that which is carried by the slave servo-manipulator unit 22. The lesser loading in the master controller increases the endurance of the operator 28 and enhances nimbleness. In the past, master controllers have been constructed mechanically identical with their slave units, so that problems of torsional and positional cross-coupling mismatches did not arise. In contrast, the present invention is constructed with mechanical dissimilarities between the master controller 20 and the slave unit 22 and includes arrangements for eliminating differences in cross-coupling effects despite the mechanical differences.

How that is arranged will be explained with reference first to the analytical models of FIGS. 11 and 12. Elements of the analytical models do not correspond to elements found in the preferred master controller 20 or slave unit 22. Instead, the layouts of the analytical models have been generalized for purposes of defining the invention and facilitating an understanding of it.

Figure 11:
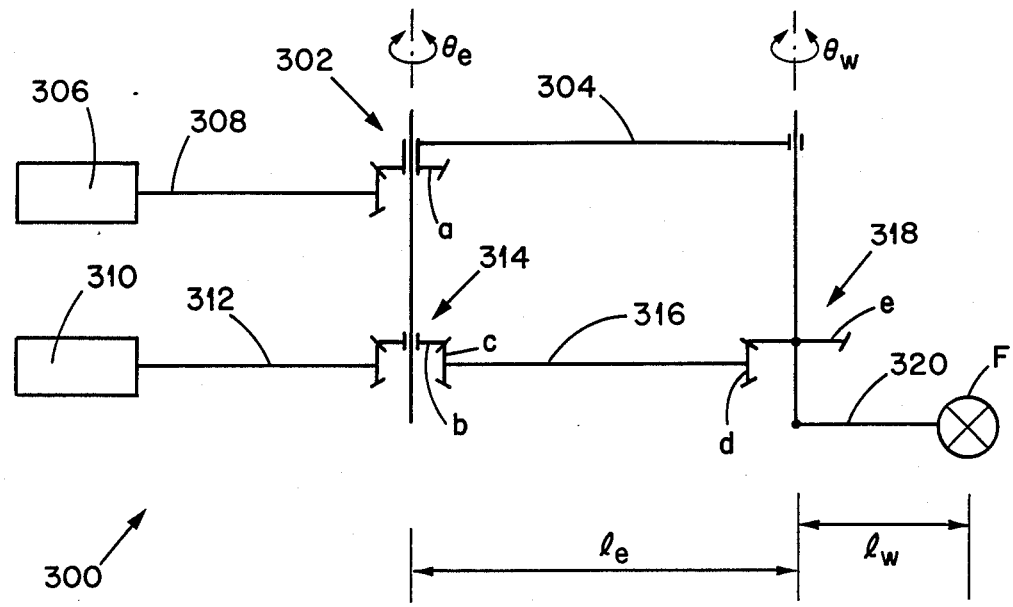
FIG. 11 is a schematic diagram of a portion of the drive arrangement of an analytical model of a generalized servo-manipulator slave unit.

Referring particularly to FIG. 11, the analytical model 300 for a generalized slave unit includes an elbow gearing arrangement 302, a forearm 304, an elbow pitch motor 306 and a torque tube 308 for transmitting torque from the motor 306 to the elbow gearing arrangement 302. The elbow gearing arrangement 302 includes a gear "a" for controlling the pitch $\theta_e$ of the forearm 304 about a desired elbow axis of rotation. A wrist pitch motor 310 is drivingly connected by a torque tube 312 to a first gear assembly 314, which in turn is drivingly connected to a second torque tube 316. The torque tube 316 extends along the forearm 304 to a second gear assembly 318. The first gear assembly 314 includes gears b and c, while the second gear assembly 318 includes gears d and e. Gears a and b may be rotated independently by the motors 306 and 310. The wrist pitch motor 310 effects pitching movement of the wrist member 320 about an angle $\theta_w$.

Accordingly, elements 306, 308 and 302 define a first drive train for effecting pitch rotation about the elbow axis. Elements 310, 312, 314, 316 and 318 define a second drive train for effecting pitch rotation at the wrist axis. The pitching movement at the wrist represents a lower degree of movement in relation the pitching movement at the elbow, because the drive train for effecting the pitching motion at the wrist is driven through the elbow.

The slave analytical model 300 includes a length $l_e$ between the axis of rotation at the elbow and the wrist and a length $l_w$ from the axis of rotation at the wrist to the load F being carried by the slave analytical model 300.

Figure 12:
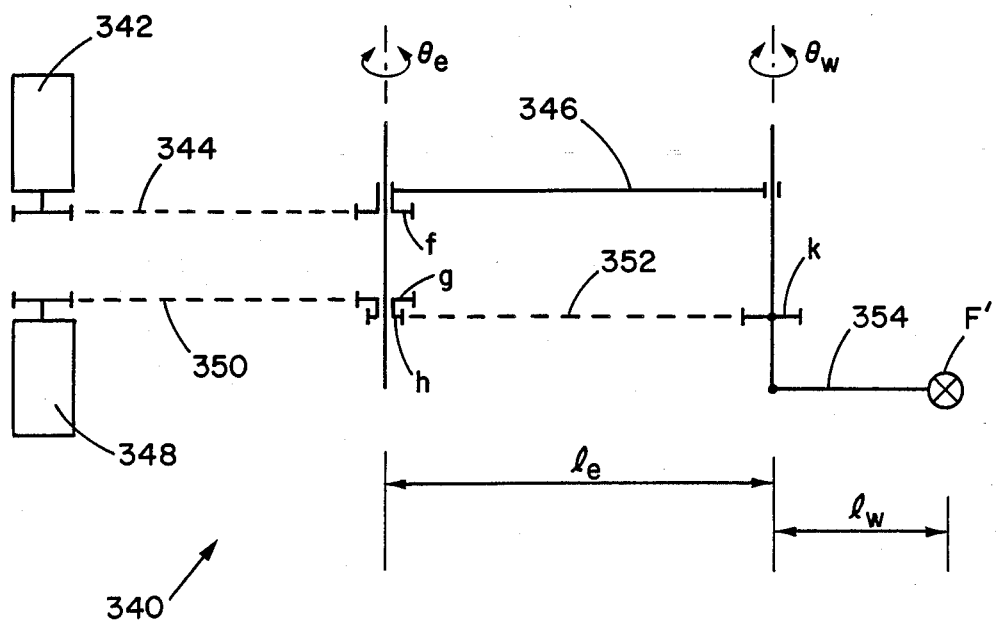
FIG. 12 is a schematic diagram of a corresponding portion of the drive arrangement of an analytical model of a generalized servo-manipulator master controller unit.

Referring to FIG. 12, master controller analytical model 340 includes an elbow motor 342, a sheave f pivotally mounted at an elbow axis, a cable 344 operatively connecting the motor 342 and the sheave f, and a forearm 346 extending from the elbow. A wrist pitch motor 348 is connected by an endless cable 350 to a sheave g, which is coaxially connected with another sheave h so that sheaves g and h rotate together about the elbow axis.

The sheave h of the analytical model 340 is connected by an endless cable 352 to a sheave k located at the wrist. The position of the sheave k about the wrist axis is represented by the angle $\theta_w$. The sheave k controls the pitching movement of the wrist member 354. The distance between the elbow and the wrist axes of rotation ($l_e$) in the analytical master controller model 340 is the same as for the analytical slave model 300. The distance between the wrist axis and the load ($l_w$) is also the same. The load on the arm in the master controller analytical model 340 is represented by F' to indicate that it is different than the load on analytical slave model 300.

Referring to the analytical models in Figs. 11 and 12 together, the design process for providing a master controller which is mechanically different from, but kinematically identical to a slave unit, involves meeting the following three analytical design requirements:

1. The motors and drive arrangements in the master controller must support the load imposed at each joint in the master controller.

2. The cross-coupling of torque at each joint of the master controller (torsional crosscoupling) must be the same as that at each corresponding joint of the slave unit; and 3. The positional cross-coupling between joints of the master controller must be the same as that between corresponding joints of the slave unit (positional cross-coupling).

In the analytical models, the load F' on the master is made less than the load F imposed upon of the slave. If the same size motors are used, which is preferred, the only variable that may be changed for supporting the load is the overall gear ratio. Also, the gearing in the slave has a different efficiency than the cable drives used in the slave, and is more efficient per mesh; but there are more gears than sheaves. The slave thus has an overall lower efficiency than the master. The individual efficiencies of each gear must also be considered. However, such considerations will become apparent to one of ordinary skill in the art upon becoming familiar with the present application. For the analysis set forth below, gear efficiencies are not considered.

The analysis, with reference to the analytical models 300 and 340 includes the following definitions and relationships:

$T_{ee}$ = the torque at the elbow axis from the elbow motors 306, 342;

$T_{ew}$ = the torque at the elbow axis from the wrist motors 310, 348;

$T_{ww}$ = the torque at the wrist axis from the wrist motors 310, 348;

F = the total force load on the slave;

$\theta_e$ = the angular position of the forearm (304, 346) about the elbow axis;

$\theta_w$ = the angular position of the wrist member (320, 354) about the wrist axis;

$r_x$ = radius of a gear or sheave x;

$W_x$ = tangential load on a gear or sheave x;

$T_w$ = the torque required at the wrist axis to support the load F, F', which equals $l_w$ multiplied by the load F, F'; and $T_e$ = the torque required at the elbow axis to support the load F, F', which equals $(l_e + l_w)$ multiplied by the load F, F'.

These entities are related as follows:

$T_e = T_{ee} + T_{ew}$ ($T_{ew}$ can be positive or negative depending on direction);

Torsional Cross-Coupling Fraction (TCCF) at the elbow = $T_{ew}/T_{ee}$;

$T_w = T_{ww}$ where gear efficiencies are ideal and the wrist is the lowest degree of movement;

$T_{ew}$ (slave) = $W_b * r_b$;

$T_{ew}$ (master) = $W_h * (r_h/r_g)$;

$W_b$ and $W_g$ will be positive if up, negative if down. It is important for the slave and master controller to be designed properly so that $T_{ew}$ is positive, or otherwise the wrist will be torquing against the elbow and creating inefficiencies; and $\theta_w = f(\theta_e)$.

In the slave analytical model 300, when the wrist motor 310 is locked, wrist gear b will not move. As the elbow is moved, wrist gear c will rotate around wrist gear b, causing wrist gear d and e to rotate and change the angular position $\theta_w$ of wrist member 320. Therefore, in the slave analytical model 300:

$\theta_w = \theta_e * (r_b/r_c) * (r_d/r_e)$; and the Positional Cross-Coupling Ratio (PCCR) of the slave model 300 = $\Delta\theta_w/\Delta\theta_e = (r_b/r_c)*(r_d/r_e)$.

Returning to the three analytical constraints that must be met in the slave and master controller, the following general relationships arise:

1. The overall gear ratio and motor torque along each drive train must be sufficient to meet the applied load. Therefore, for each degree of movement; in the analytical slave 300 and in the analytical master controller 340:

$T_m R_i = F * l_i$ where, $T_m$ = motor torque, $R_{i=\text{overall gear ratio along the drive train for } i^{th} \text{ degree of movement}}$ F = end effective load on the arm F equals F' for the master controller, $l_i$ = moment arm for $i^{th}$ degree of movement (DOF).

2. The torsional cross-coupling fraction (TCCF) and the positional cross-coupling fraction (PCCF) in the analytical master controller model 340, for each DOF, are to equal those of the corresponding DOF in the slave, so that $TCCF_i$ slave = $(T_{ij}/T_{ii})$ i master The TCCF values are matched between the analytical slave and analytical master controller for each DOF when designing the master controller to reflect the amount of torsional cross-coupling in the $i^{th}$ DOF due to the lower $j^{th}$ DOF's.

The positional cross-coupling fractions (PCCF) between DOF's in the analytical master controller are to be matched between the corresponding DOF's of the analytical slave. For example, in the models 300 and 340:

$PCCF_{master} = (r_b/r_c)*(r_d/r_e)$ slave, which is the effective gearing from the $i^{th}$ joint to the $j^{th}$ joint in the analytical slave 300.

Now, in applying the relationships to a particular analytical example of the slave and master controller models 300 and 340, assume:

F = 10 lb

F' = 2.5 lb $l_e$ = 10"

$l_w$ = 5"

$T_m$ = 10"lb (for all motors).

1. The overall gear ratios are calculated as follows:

slave elbow: 10 lb (15") = 150" lb = $T_m R_e$  $R_e$ = 150"lb/10" lb = 15:1  $r_a$ = 15"

slave wrist: 10 lb (5") = 50"lb = $T_m R_w$  $R_w$ = 50/10 = 5:1

The ratio of 5.0 along the slave wrist drive is then alloted arbitrarily between the elbow and wrist drive trains as follows:

2.5:1 in the elbow, $r_b$ = 2.5"

2:1 in the wrist, $r_e$ = 2"

Similarly, in the master controller analytical model 302 and further assuming that the motors 342 and 348 are provided with one inch (1") sheaves: master elbow: $R_e$ = 2½lb (15")/10"lb = 3.75:1 $f_f$ = 3.75"

master wrist: Rw = 2½lb (5")/10"lb = 1.25:1

Accordingly, $(r_g/r_l)*(r_k/r_h)$ = 1.25 (Equation No. 1)

2. The torsional cross-coupling is matched with the following relationships:

In the analytical slave 300 and assuming the radii of the gears at the end of torque tubes 308 and 312 equal one-inch (1"):

$T_{ew} = W_b * r_b = (10 \text{ lb})(2.5") = 25"\text{lb}$;

TCCF = $T_{ew}/T_{ee}$ = 25"lb/150"lb = 0.1667

In the analytical master controller 340:

TCCF = 0.1667 = $T_{ew}/T_{ee} = W_h * r_h = T_m * (r_h/r_g)/37.5$; and $r_h/r_g$ = 0.1667 * 37.5 lb/10"lb = 0.725 (Equation No. 2)

3. The positional cross-coupling is matched with the following relationships:

In the analytical slave 300:

PCCF = (2.5/1) (1/−2) = −1.25

(for every revolution of the elbow up, the wrist moves down 1.25 revolutions)

In the analytical master 340:

PCCF = $r_h/r_k$ = −1.25 (Equation No. 3)

Solving Equation Nos. 1, 2, and 3 simultaneously provides solutions for the radii of sheaves g, h and k of the master model 340 as follows:

$r_g$ = 1.56";

$r_h$ = 1.13"; and $r_k$ = 0.90".

In the actual master controller 20 and slave unit 22, there are many more gears and many more cross-coupled relationships, but the principles illustrated by the foregoing equations and relationships discussed with respect to the analytical models 300 and 340 still apply if they are extended consistently.

With the above discussed design constraints and in undergoing a reiterative application of the analysis described above, the following design constraints were derived such that torsional coupling and positional coupling is matched between the slave unit 22 and the master controller 20:

1. $T_{elbow}$ = motor torque, i.e. a 1:1 ratio is provided at the elbow joint 56 of the master controller 20.

2. Ratios through the elbow:

= 1.6652 for pitch/roll; and

= 1.3174 for roll

3. Ratios in the wrist:
=1.985:1 for pitch/roll; and
=1.622:1 for roll

Based upon those design constraints, the master controller 20 can be provided with a specific set of sheave diameters.

The actual master controller 20 is geometrically similar to the slave unit 22 of the advanced servo-manipulated system 24. Although the master controller 20 is mechanically different from the slave unit 22 (cable drive versus torque tube and gearing), the drive arrangements of the master controller 20 provide enhanced force reflection and accurate positional response by eliminating crosscoupling differences between the master controller 20 and the slave unit 22.

Preferably, the cables in the master controller 20 are constructed of aramid fiber. Tapes or other equivalent forms of cable would also be suitable. The tubular casings that make up the outer portions of the upper arm 54 and the forearm 58 are preferably made of graphite composites to increase their stiffness and minimize their weight.

It is to be noted that the two uppermost degrees of movement (the shoulder roll and shoulder pitch) of the actual master controller 20 are gear driven as in the slave unit 22. Likewise, the elbow pitch movement is gear driven in both the master controller 20 and slave unit 22. Because the load capacity of the master 20 is designed to be much less than that of the slave unit 22, the gear trains at the upper degrees of movement in the master are made smaller and simpler.

The drives for three wrist motions (pitch, yaw and roll) preferably include 1:1 ratio gears in the gear box 102 to transmit torque from the motors to the drive sheaves 142.

The advanced servo-manipulator system 24 is designed with the slave unit 22 having a 4:1 load ratio with the master controller 20. The slave unit 22 preferably has a 35-pound continuous load capacity and a 50-pound peak capacity.

It is to be understood that the present invention may be embodied in other specific forms without departing from the spirit or essential characteristics of the invention. The invention allows any type of mechanically dissimilar master and slave to be matched kinematically; for example, a chain driven slave with a cable driven master, or a cable driven slave and a chain driven master, or a gear driven slave with a bar linkage driven master, etc. One suggested combination is a four bar linkage driven master because of its low friction and low inertia with a gear driven slave because of its remote maintainability features. It should be possible to match any combination of mechanically dissimilar master and slave systems. The preferred embodiment is therefore to be considered illustrative and not restrictive.

The scope of the invention is indicated by the appended claims rather than by the foregoing descriptions and all changes or variation which fall within the meaning and range of the claims are therefore intended to be embraced therein.

What is claimed is:

1. A master controller for controlling a mechanically dissimilar slave servo-manipulator;
    the slave servo-manipulator comprising a first slave member, a first slave joint and a first slave drive train cooperating to define a first degree of slave movement, a second slave member connected with said first slave member, a second slave joint, and a second slave drive train operative through said first and second slave joints so as to define a second, lower degree of slave movement, said first and second slave drive trains including gears located at said first and second slave joints, said gears defining at said first slave joint a first torsional cross-coupling ratio, and said gears defining between said first and second slave joints a first positional cross-coupling ratio; and
    said master controller comprising a first master member, a first master joint and a first master drive train cooperating to define a first degree of master movement, a second master member connected with said first master member, a second master joint, and a second master drive train operative through said first and second master joints so as to define a second, lower degree of master movement, said first and second master members and said first and second master joints being mutually arranged so as to replicate identically the kinematic arrangement of said first and second slave members and said first and second slave joints, said first and second master drive trains including sheaves located at said first and second master joints, said sheaves defining at said first master joint a second torsional cross-coupling ratio equal to said first torsional cross-coupling ratio, and said sheaves defining between said first and second master joints a second positional cross-coupling ratio equal to said first positional cross-coupling ratio.

2. A master controller as claimed in claim 1, wherein said first and second slave drive trains include torque tube means for transmitting torque to said gears, and said first and second master drive trains include cable means for transmitting torque to said sheaves.

3. A master controller for controlling a mechanically dissimilar slave servo-manipulator, said master controller comprising:
    an arrangement of master members and master joints identically replicating the kinematic arrangement of the slave servo-manipulator, the arrangement including first and second master joints that kinematically replicate first and second slave joints of the slave servo-manipulator, respectively; and
    means for transmitting torsional loads through said first and second master joints of said arrangement, said transmitting means being mechanically dissimilar from corresponding torsional load transmitting means of the slave servomanipulator, said master controller transmitting means including a first drive element located at said first master joint for producing a first degree of movement in said arrangement, a second drive element located at said first master joint and a third drive element located at said second master joint, said second and third drive elements cooperating to produce a second, lower degree of movement in said arrangement, wherein said first drive element is proportioned relative to said second drive element so as to match the torsional cross-coupling ratio of the first slave joint, and said second drive element is proportioned relative to said third drive element so as to match the positional cross-coupling ratio existing between the first and second slave joints.

4. A method for controlling a slave servomanipulator, said method comprising the steps of:

manually operating an arrangement of members and joints that kinematically replicate the slave servo-manipulator; and producing cross-coupling loads in said arrangement identical to cross-coupling loads produced in the slave servo-manipulator, wherein the identical cross-coupling loads are produced by:

transmitting torsional loads along the joints of said arrangement with a mechanical drive train different from that of the slave servomanipulator, matching the cross-coupling load at each joint in the arrangement to the cross-coupling load of the corresponding joint of the slave servomanipulator, and matching the positional cross-coupling ratio between joints in the arrangement to the positional cross-coupling ratio between corresponding joints of the slave servo-manipulator.

5. A method as claimed in claim 4, wherein said torsional load transmitting step includes operating cables and sheaves located in said arrangement while operating torque tubes and gears in the slave servo-manipulator.

6. A master controller for controlling a slave servo-manipulator, comprising:

at least one manually manipulative arm including a shoulder joint, an upper arm member extending from said shoulder joint, a forearm member, an elbow joint operative between a proximal end portion of said forearm member and said upper arm member, means for actuating a tong arrangement of the slave servo-manipulator, and a wrist joint operative between a distal end portion of said forearm member and said actuating means;

a plurality of motors located adjacent one another at said shoulder joint;

means for transmitting the output of said motors to said members through said joints, said transmitting means including sheaves located at said joints and a plurality of cables within said members extending between said joints and engaging said sheaves, said sheaves having diameters so as to provide a torque cross-coupling that substantially duplicates the torque cross-coupling in the corresponding slave joints;

said sheaves also providing positional cross-coupling between adjacent joints of said master controller that substantially duplicates the positional cross-coupling between corresponding joints of the slave servo-manipulator.

7. A method for kinematically matching a master controller with a mechanically dissimilar slave servo-manipulator unit, comprising the steps of:

determining a torsional cross-coupling fraction in a joint of said slave unit;

determining a positional cross-coupling fraction between joints of said slave unit;

matching the determined torsional crosscoupling fraction by selecting drive ratios at a geometrically corresponding joint of said master controller; and matching the determined positional crosscoupling coupling by selecting relative drive ratios between geometrically corresponding joints of said master controller.

* * * * *